(12) United States Patent
Tseng (10) Patent No.: US 7,083,343 B2
(45) Date of Patent: Aug. 1, 2006

(54) KEYBOARD KEYS USING MARKED ELASTIC DOMES AND FABRICATION METHOD THEREOF

(75) Inventor: Hung-Ming Tseng, Taichung (TW)

(73) Assignee: Darfon Electronics Corp., Taoyuan (TW)

( * ) Notice: Subject to any disclaimer, the term of this patent is extended or adjusted under 35 U.S.C. 154(b) by 0 days.

(21) Appl. No.: 10/386,012

(22) Filed: Mar. 10, 2003

(65) Prior Publication Data

US 2003/0175065 A1    Sep. 18, 2003

(30) Foreign Application Priority Data

Mar. 14, 2002   (TW) .............................. 91104864 A (51) Int. Cl.
*B41J 5/12* (2006.01)
(52) U.S. Cl. ...................... 400/490; 400/493; 400/494; 264/219
(58) Field of Classification Search ................ 400/490, 400/493, 494; 264/219–227; 200/344
See application file for complete search history.

(56) References Cited

U.S. PATENT DOCUMENTS

| | | | | |
|---|---|---|---|---|
| 4,039,068 A | * | 8/1977 | Giorza et al. ................ | 400/491 |
| 4,525,044 A | * | 6/1985 | Bauman .................. | 351/160 H |
| 5,467,149 A | * | 11/1995 | Morrison et al. ............ | 351/162 |
| 5,641,437 A | * | 6/1997 | Williams et al. ............. | 264/2.5 |
| 5,898,145 A | * | 4/1999 | Su .............................. | 200/344 |
| 6,024,448 A | * | 2/2000 | Wu et al. ................ | 351/160 R |
| 6,203,156 B1 | * | 3/2001 | Wu et al. ................ | 351/160 R |
| 2002/0195732 A1 | * | 12/2002 | Clark et al. ................... | 264/2.5 |

* cited by examiner

*Primary Examiner*—Andrew H. Hirshfeld
*Assistant Examiner*—Jill E. Culler
(74) *Attorney, Agent, or Firm*—Ladas & Parry LLP (57) ABSTRACT

Keyboard keys using a marked elastic dome and the fabrication method thereof. The method for fabricating elastic domes first includes providing a mold having a plurality of mold cavities with a markable surface. Next, a plurality of different marks is formed on the markable surface of each of the mold cavities. An elastic membrane with a plurality of marked elastic domes is formed by the mold. The marks on the elastic domes represent the position with respect to the mold cavities on the mold and the parameters of fabricating the elastic membrane. Finally, the marked elastic domes are separated from the elastic membrane and used in keys of a keyboard.

11 Claims, 13 Drawing Sheets

| serial number \ aria | A | B | C |
|---|---|---|---|
| 001 | 0 | 0 | 1 |
| 002 | 0 | 0 | 2 |
| ≀ | ≀ | ≀ | ≀ |
| 010 | 0 | 1 | 0 |
| 011 | 0 | 1 | 1 |
| ≀ | ≀ | ≀ | ≀ |
| 100 | 1 | 0 | 0 |
| 101 | 1 | 0 | 1 |
| ≀ | ≀ | ≀ | ≀ |
| 999 | 9 | 9 | 9 |
| 1000 | 0 | 0 | 0 |

KEYBOARD KEYS USING MARKED ELASTIC DOMES AND FABRICATION METHOD THEREOF

BACKGROUND OF THE INVENTION

1. Field of the Invention

The present invention relates to keyboard keys with marked elastic domes and the fabrication method thereof, and in particular to elastic domes with geometric marks for the keys of a notebook computer and the fabrication method thereof.

2. Description of the Related Art

Figure 1A:
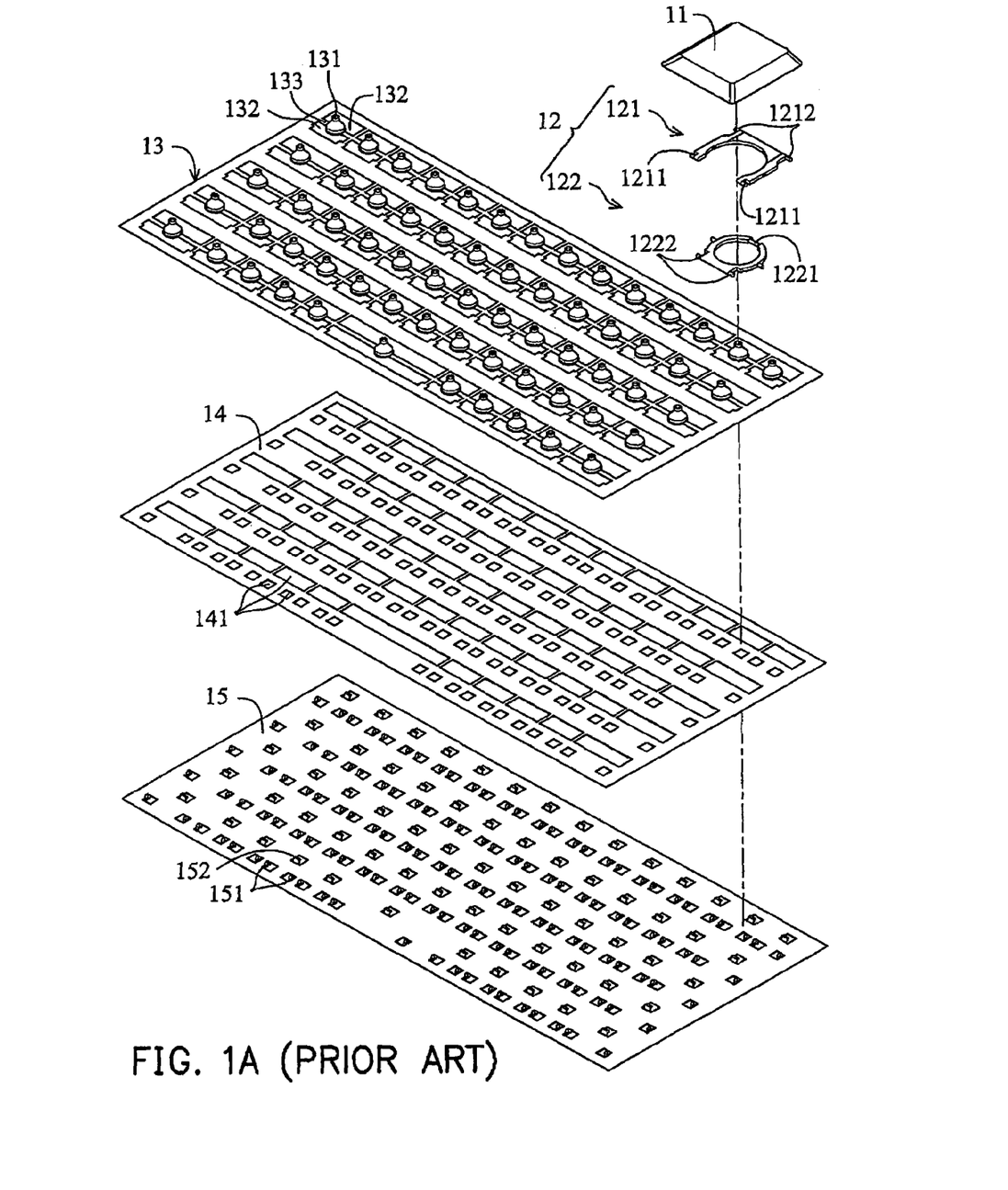
FIG. 1A is an exploded view of keys of the conventional keyboard as referenced in the Prior Art.
Figure 1B:
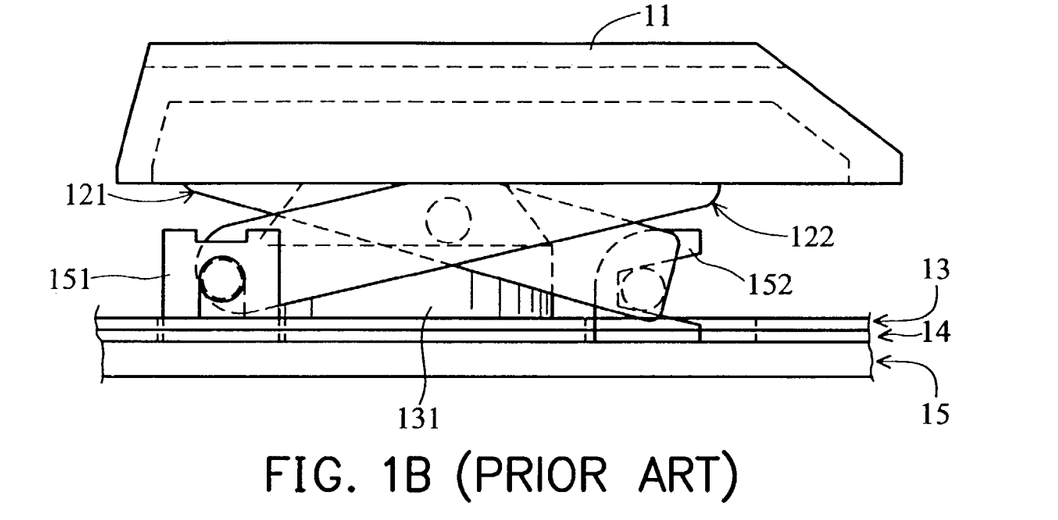
FIG. 1B is a cross section of a key of the key board in FIG. 1A.

FIG. 1A is an exploded view of a conventional keyboard. FIG. 1B is a cross section of a key of a notebook computer. In order to simplify the drawing, FIG. 1A only shows one key of a conventional keyboard. In FIG. 1A, the key of a keyboard for a notebook computer includes a key cap 11, a cap support 12, an elastic sheet 13, a circuit membrane assembly 14 and a base sheet 15.

The base sheet 15 is a metal sheet on which two seats 151 and a hook 152 are formed by punching and contacting.

The circuit membrane assembly 14 is disposed on the base sheet 15. It comprises the circuit of the keyboard and a plurality of holes 141 with respect to the seats 151 and the hook 152 of the base sheet 15.

The elastic sheet 13 has a sheet-like body, an elastic dome 131, a connecting portion 133 and holes 132. The connecting portions 133 connect the elastic dome 131 and the sheet-like body. Further, the elastic dome 131 has a plunger (not shown) inside to contact the circuit membrane assembly 14 and conduct the circuit thereto.

The cap support 12 has a first linking bracket 121 and a second linking bracket 122. The shaft portions 1221 of the second linking bracket 122 are inserted into the holes 1211 of the first linking bracket 121, so that the first linking bracket 121 and the second linking bracket 122 are hinged together. This structure is known as a scissors-type support mechanism. Furthermore, the first linking bracket 121 has shaft rods 1212. The second linking bracket 122 has shaft rods 1222 on its corners.

Figure 1C:
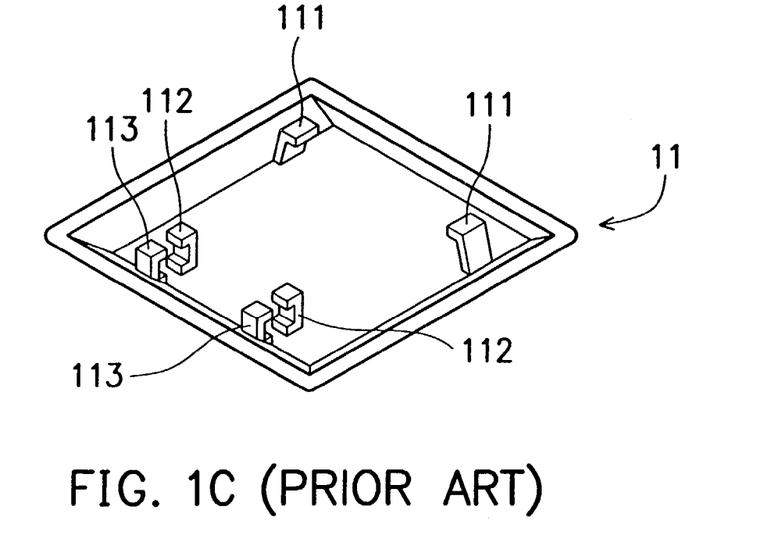
FIG. 1C is a schematic back view of a key cap of the key in FIG. 1A.

FIG. 1C is a schematic back view of a key cap of the key in FIG. 1A. In FIG. 1C, the key cap 11 has hooks 111 and holding portions 112, 113 on its bottom surface.

In FIGS. 1A~1C, while assembling the conventional keyboard, the circuit membrane assembly 14 and the elastic sheet 13 are put on the base sheet 15. The seats 151 and the hook 152 of the base sheet 15 protrude through the holes 141 of the circuit membrane assembly 14 and the holes 132 of the elastic sheet 13. The key cap 11 is mounted on the base sheet 15 via the cap support 12. The shaft rods 1212 are inserted into the seats 151 SO that the first linking bracket 121 is rotatable with respect to the base sheet 15. The narrow portion 1221 of the second linking bracket 122 is hooked by the hook 152 of the base sheet 15 so that the second linking bracket 122 is also rotatable with respect to the base sheet 15. The hooks 111 hold the shaft rods 1212 of the first linking bracket 121, and the holding portions 112, 113 hold the shaft rods 1222 of the second linking bracket 122. Furthermore, the L-shaped hooks 111 contact the first linking bracket 121 in FIG. 1C.

In operation, the user pushes down the key cap 11 and compresses the elastic dome 131. Then, the plunger of the elastic dome 131 contacts the circuit membrane assembly 14 so that a completed circuit is induced to send out a corresponding signal.

The elastic domes of conventional keyboards are made by molding. An elastic membrane with a plurality of elastic domes is first formed. The elastic domes are separated from the elastic membrane, and then the elastic domes are bonded on the elastic sheet 13 arbitrarily. During the process, however, when elastic domes are broken, it is unknown which mold cavities have defects, or whether the mold or jigs are improperly designed. Thus, there must be an additional sifting process during assembly. The broken elastic domes must be sifted out before the adhesion process to avoid producing keyboards with bad keys, and thus the sifting process causes the running cost of manufacturing keyboards to increase.

SUMMARY OF THE INVENTION

Accordingly, an object of the invention is to provide marked elastic domes made by a mold with marked mold cavities. The related mold cavities can be checked according to the marks on broken elastic domes. The marked elastic domes thoroughly solve the problem and save time spent in the sifting process.

Another object of the invention is to provide a key structure using the elastic dome of the invention. It is easy to trace defects in the mold and jigs, such that the running cost is reduced.

The present invention provides a method for fabricating elastic domes. The method first comprises providing a mold having a plurality of mold cavities with markable surfaces. Next, a plurality of different marks is formed thereon. An elastic membrane with marked elastic domes is formed by the mold. The marks on the elastic domes represent the position or a serial number with respect to the mold cavities on the mold. Finally, the marked elastic domes are separated from the elastic membrane.

According to the method of the invention, the marks represent the parameters of fabricating the elastic membrane.

The present invention also provides a marked elastic dome made by the method provided above. The marked elastic dome has a main body with a markable surface and a plurality of marks disposed therein. The markable surface is divided into a plurality of mark areas to separate the marks into groups. The second marks of each of the mark areas have the same intervals. The marks between each two mark areas are protrusions or recesses, and the figures thereon are different.

According to the invention, the elastic dome further includes a datum on the markable surface and separations between each two mark areas. Furthermore, the separations are protrusions or recesses with a figure different from the figure of the second marks.

The present invention also provides a key structure using a marked elastic dome made by the method provided above. The linking mechanism of the key movably connects a key cap and a base sheet. An elastic dome has a markable surface with marks and is disposed on the base sheet below the key cap.

Moreover, the elastic dome further includes a flange at the bottom portion. The markable surface is the top surface of the flange.

Moreover, the elastic dome further includes a contact portion for supporting the key cap. The markable surface is the top surface of the contact portion.

A detailed description is given in the following embodiments with reference to the accompanying drawings.

BRIEF DESCRIPTION OF THE DRAWINGS

The present invention can be more fully understood by reading the subsequent detailed description and examples with references made to the accompanying drawings, wherein:

FIG. 3I is a top view of a marked elastic dome of another embodiment of the invention;

DETAILED DESCRIPTION OF THE INVENTION

In FIGS. 1A and 1B, the key comprises a base sheet 15, a linking mechanism 12, a key cap 11, and an elastic dome 131. The linking mechanism 12 of the key movably connects a key cap 11 and a base sheet 15. The elastic dome 131 is disposed on the base sheet 15 below the key cap 11.

First Embodiment

According to the key structure stated above, the diameter of the elastic dome is about 3 to 8 mm. There is not enough area to mark a number on the elastic dome. Thus, the elastic dome of the invention is marked on the flange or the contact portion to show the serial number, or position, of the mold cavities on the mold.

Figure 2A:
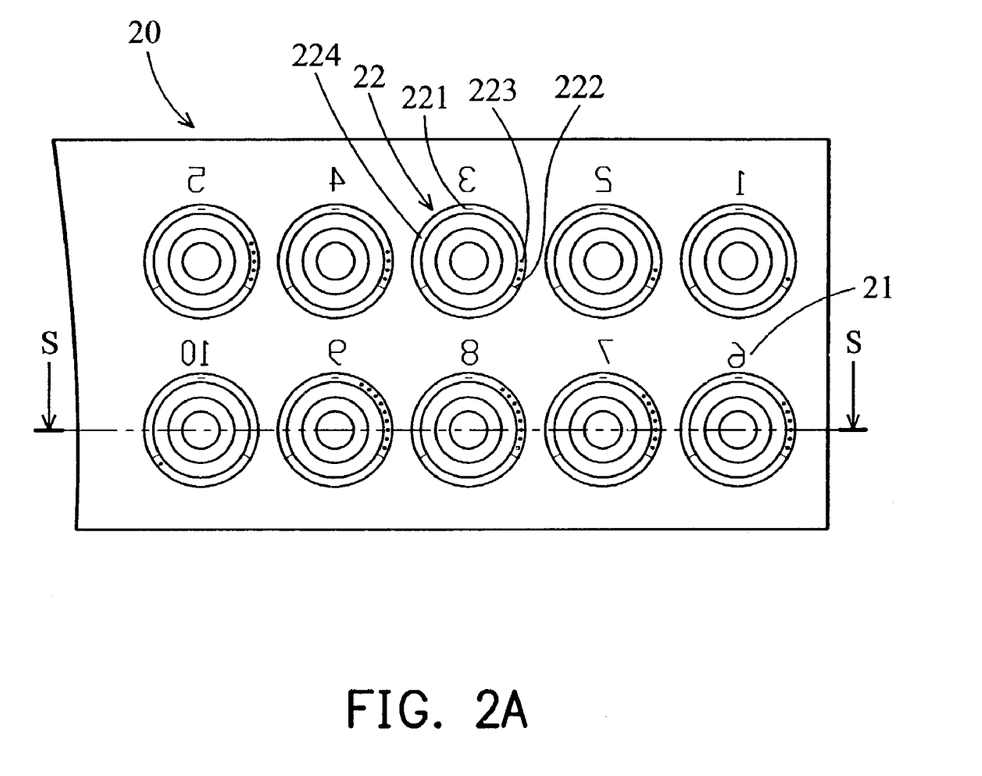
FIG. 2A is a top view of the cope of the mold for manufacturing the elastic domes of the invention.
Figure 2B:
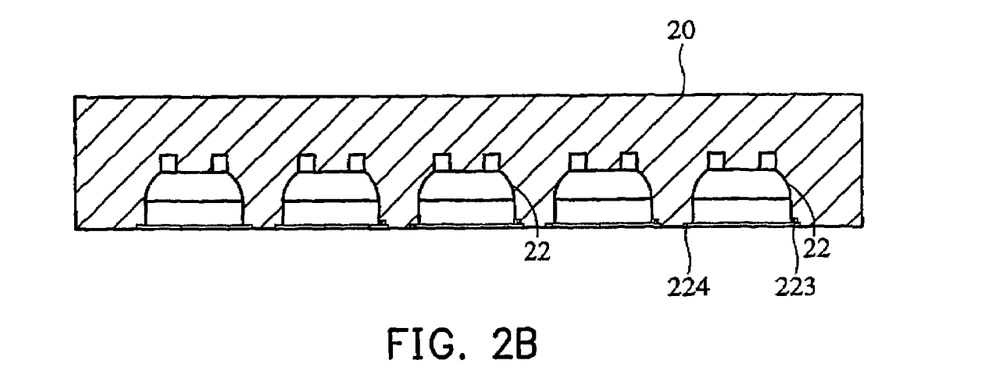
FIG. 2B is a cross section of the line S—S in FIG. 2A.
Figure 2C:
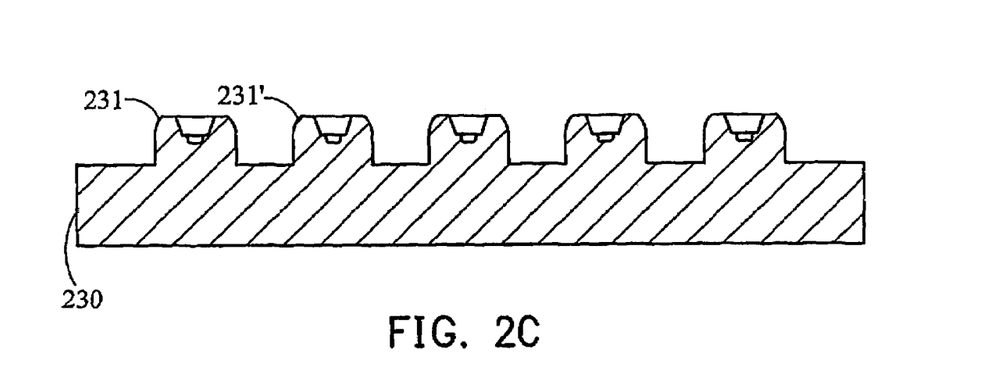
FIG. 2C is a cross section of the drag of the mold for manufacturing the elastic domes of the invention.

FIG. 2A is a top view of the cope of the mold for manufacturing the elastic domes of the invention. FIG. 2B is a cross section of the line S—S in FIG. 2A. FIG. 2C is a cross section of the drag with respect to the cope in FIG. 2A. In FIGS. 2A and 2B, the cope 20 of the mold has a plurality of mold cavities 22. Each mold cavity 22 is numbered by a serial number 21 and has a first markable surface 224 with different first marks 223. In this embodiment, the marks disposed on the first markable surface 224 include a datum 221, separations 222, and a plurality of first marks 223. The first markable surface 224 is divided into three mark areas by the datum 221 and the separations 222 to distinguish the first marks 223 into three groups. The datum 221, the separations 222, and the first marks 223 are recesses. The datum 221 is a tangent short line. The separations 222 are radial short lines. The first marks 223 are circular spots. Furthermore, the first marks 223 of each mark area have the same intervals. The datum 221 is a start point for determining the serial number of each mold cavity 22. In FIG. 2C, the drag 230 has protrusions 231, 231' with respect to the mold cavities 22 on the cope 20.

Figure 3A:
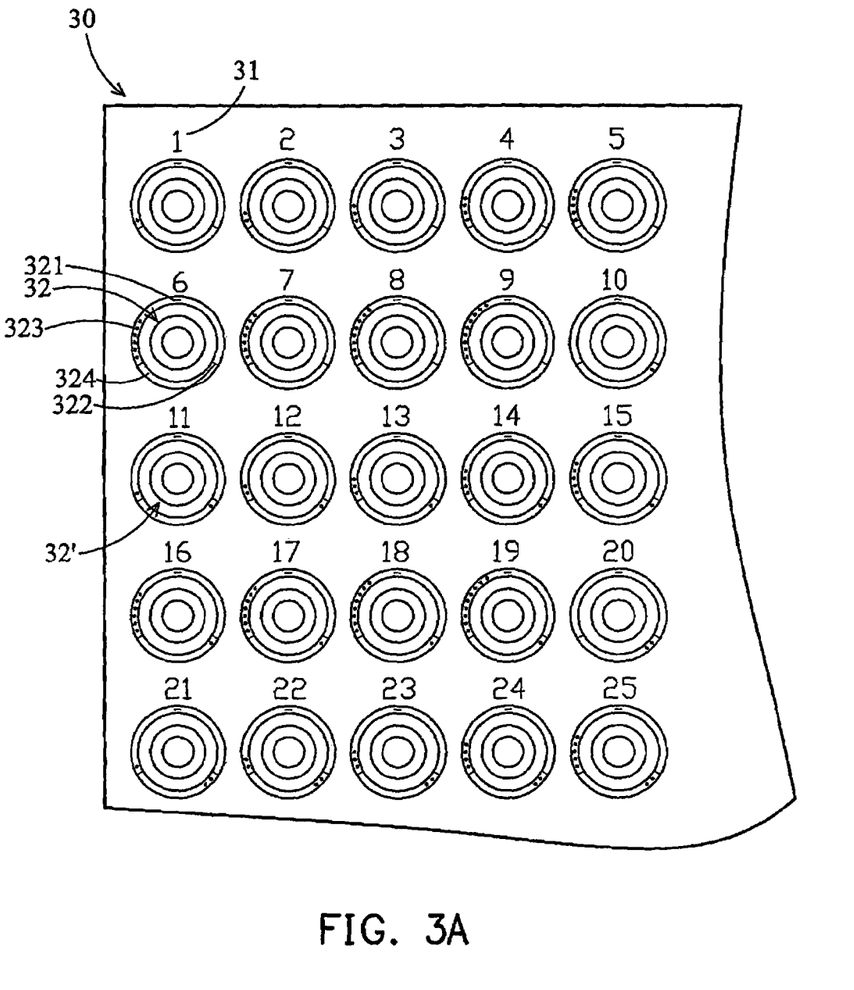
FIG. 3A is a partial top view of the elastic membrane with elastic domes.

FIG. 3A is a partial top view of the elastic membrane with elastic domes. The elastic membrane in FIG. 3A is formed by the mold shown in FIGS. 2A~2B. The elastic membrane is rubber. It has a plurality of elastic domes 32. Each of the elastic domes 32 has a flange 324 at the bottom portion and a serial number 31 with respect to the mold cavities 22 on the cope 20 in FIG. 2A. Each of the flanges 324 has a datum 321, separations 322 and second marks 323 disposed thereon. The elastic domes 32 are then separated from the elastic membrane 30 by jigs and used in the key structure of the invention.

Figure 3B:
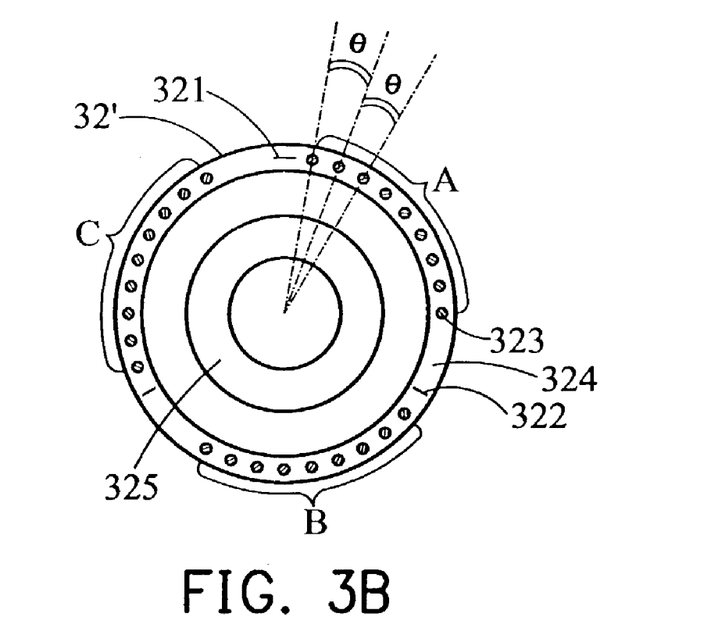
FIG. 3B is a top view of a marked elastic dome of the invention.
Figure 3C:
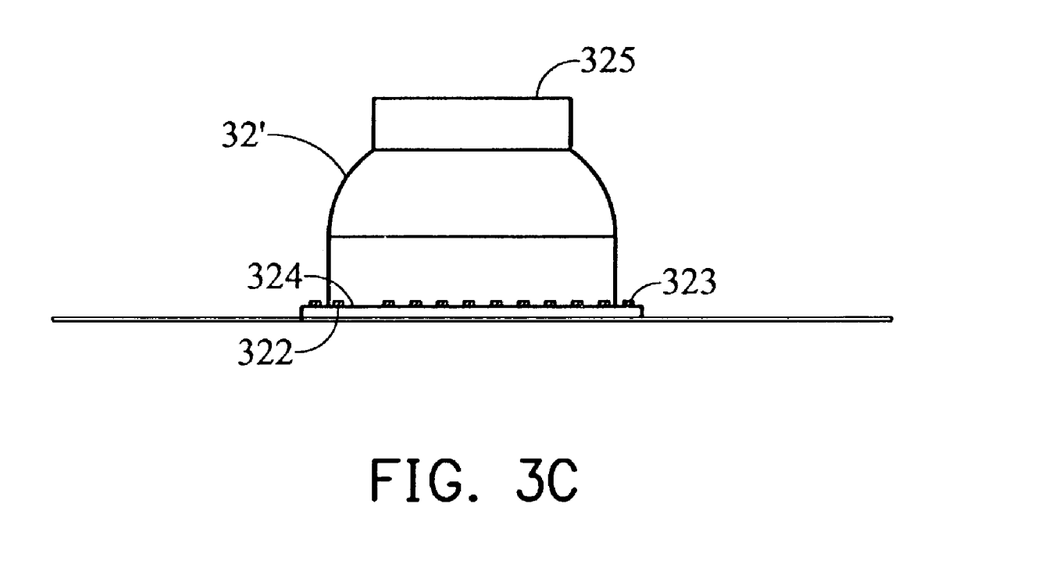
FIG. 3C is a side view of a marked elastic dome of the invention.

FIG. 3B is a top view of the marked elastic dome of the invention, and FIG. 3C is its side view. In this embodiment, the elastic dome 32' has a flange 324 at the bottom portion. The top surface of flange 324 is taken as a second markable surface with respect to the first markable surface 224 of the mold cavities 22 in FIG. 2A. The datum 321, the separations 322, and the second marks 323 are protrusions with respect to the datum 221, the separations 222, and the second marks 223. As well, the datum 321 is a tangent short line. The separations 322 are radial short lines. The second marks 323 are circular spots. The second markable surface of the flange 324 is divided into three mark areas named area A, area B and area C by the datum 321 and the separations 322. The second marks 323 are divided into three groups. The second marks 323 of each mark area (area A~C) have the same angular intervals θ. The datum 321 is a start point for determining the serial number of each mold cavity 22. Furthermore, other shapes of protrusions, such as square or triangle, can be replaced the second marks, the datum and the separations.

Figure 3D:
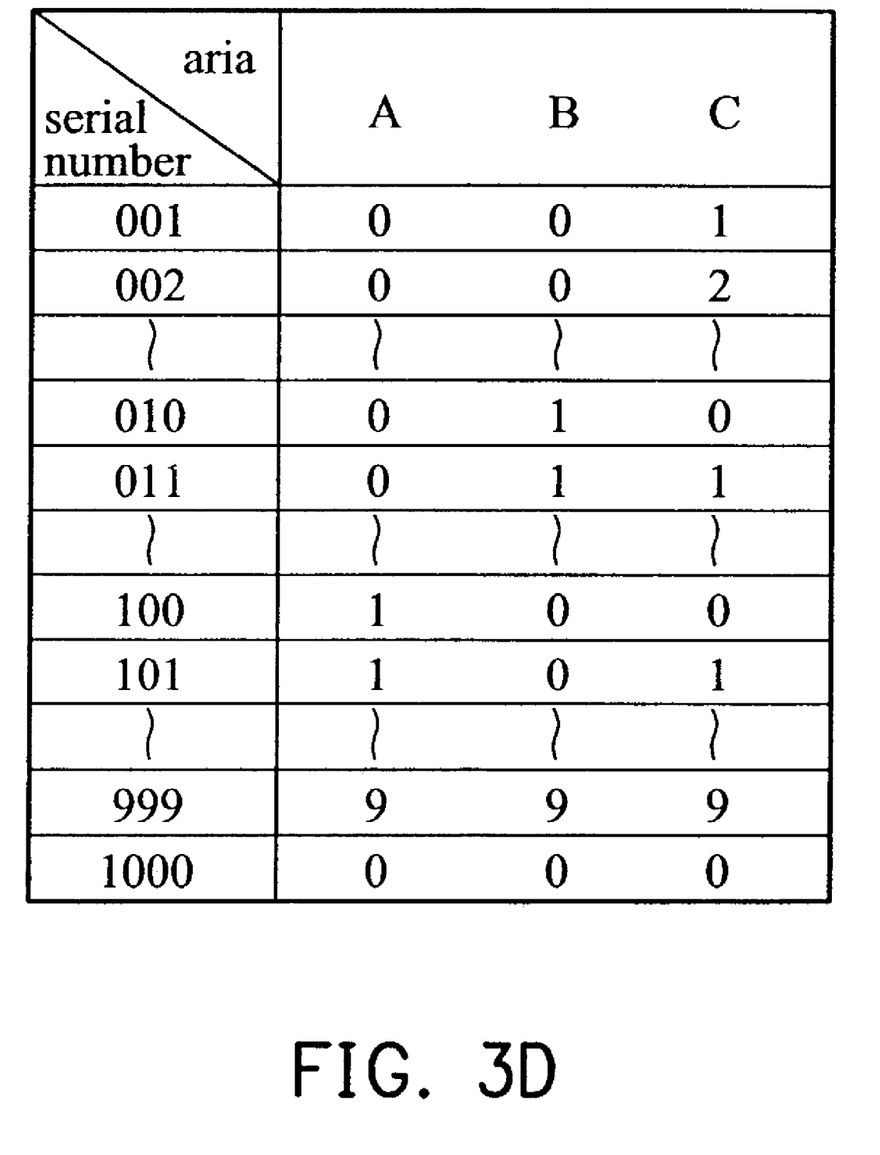
FIG. 3D is a table for the marks on the elastic dome in FIG. 3B.

FIG. 3D is a table for the marks on the elastic dome in FIG. 3B. In FIGS. 3B-3D, the second markable surface of the flange 324 is divided into three mark areas or groups clockwise named areas A, B, and C. The second marks in area A represent the hundreds place of the serial number. As well, the digit in area B represents the tens place, and the digit in area C represents the ones place of the serial number, revealing the serial number of the elastic dome and the related mold cavity. For an example, if the area A of the elastic dome 32' has four protrusions, the area B has no protrusions, and the area C has seven protrusions, the serial number of the elastic dome is 407. If this elastic dome is broken, the related mold cavity on the mold can be identified to find the defects.

Figure 3E:
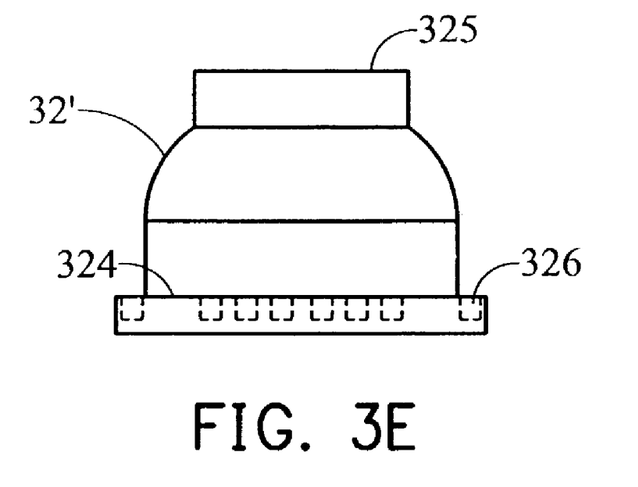
FIGS. 3E~3H are side views of a marked elastic dome of other embodiments of the invention.

According to this embodiment, the second marks, the datum and the separations can be recesses 326 (FIG. 3E) or through holes 327 (FIG. 3H) on the flange 324.

Figure 3F:
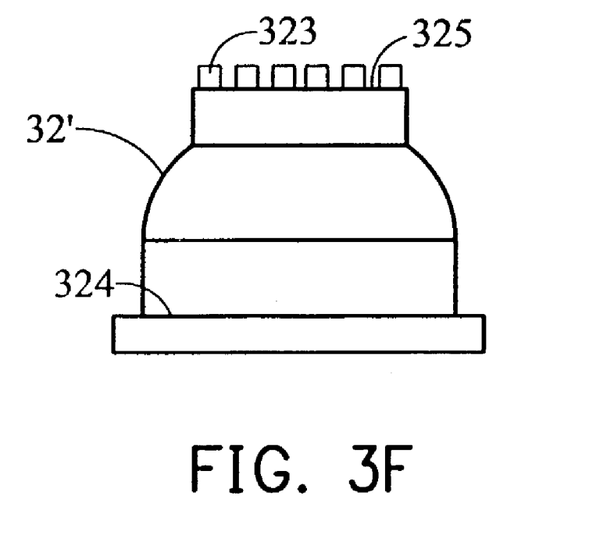
Figure 3G:
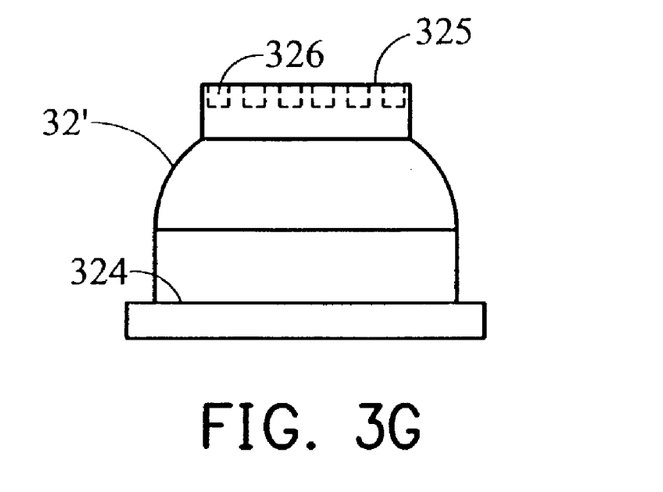
Figure 3H:
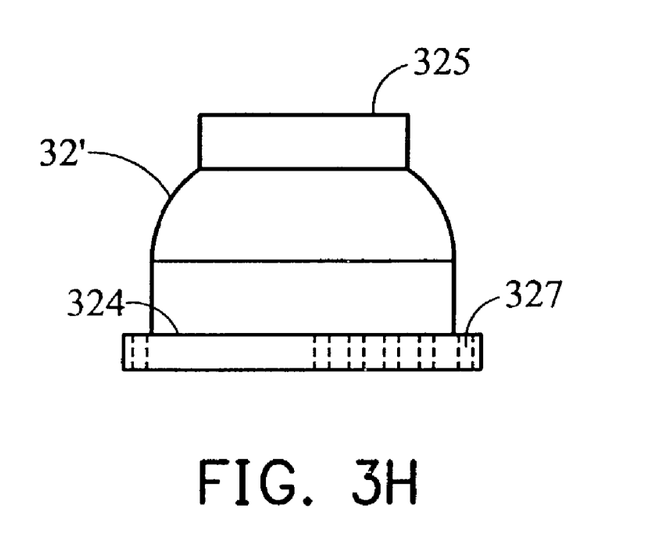

Furthermore, the elastic dome 32' has a top surface on a contact portion 325 to support a key. The second marks, the datum and the separations can be protrusions 323 (FIG. 3F) or recesses 326 (FIG. 3G) on the top surface of the contact portion 325 of the elastic dome 32'. As well, the second marks can be through holes on the flange of the elastic dome (FIG. 3H).

In FIG. 3I, each group of the second marks 328a, 328b, and 328c on the flange 324 has different shapes. The datum and the separations are canceled by setting the circular protrusions 328a as the start point. Thus, the second marks 328a, 328b, and 328c identify the serial number of the elastic dome 32'.

In this embodiment, the number of the mark areas can be increased or reduced according to the number of the mold cavities on the mold. In addition, the fabricating parameters can be recorded by adding additional mark areas, such as a batch number, a mold number and the temperature or the pressure of molding processes. Moreover, more mold cavities on the mold can be numbered by adding more mark areas.

Second Embodiment

Figure 4:
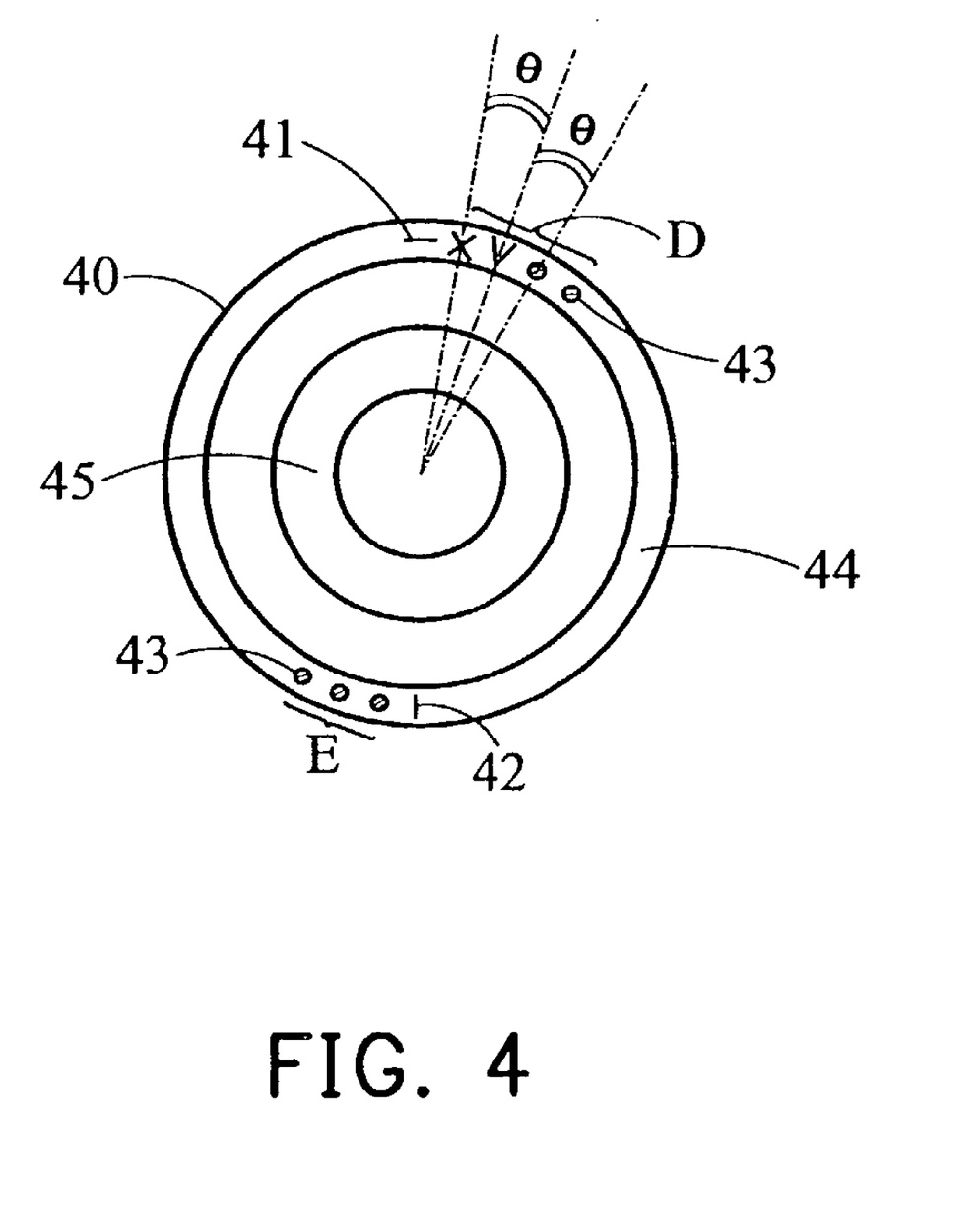
FIG. 4 is a top view of a marked elastic dome of another embodiment of the invention.

FIG. 4 is a top view of a marked elastic dome of the second embodiment of the invention. In FIG. 4, the top surface of the flange 44 or the contact portion 45 is the second markable surface. There are a datum 41 and a separation 42 dividing the second markable surface into areas D and E. A plurality of the second marks 43 is disposed on the second markable surface. The second marks 43 have the same intervals Θ. The second marks 43 in the area D represent the row number of the mold cavities on the mold. The second marks in the area E represent the column number of the mold cavities on the mold. In this embodiment, different second marks 43, or symbols, represent "10", "5", and "1". In FIG. 4, "X" represents "10", "V" represents "5" and the circular spot represents "1". Different second marks avoid calculating errors and save time. The serial number of the elastic dome 40, or mold cavity, is determined by adding the number on the elastic dome 40. That is (17,3), which means the elastic dome 40 is formed by the mold cavity at the seventeenth row and the third column.

Figure 5:
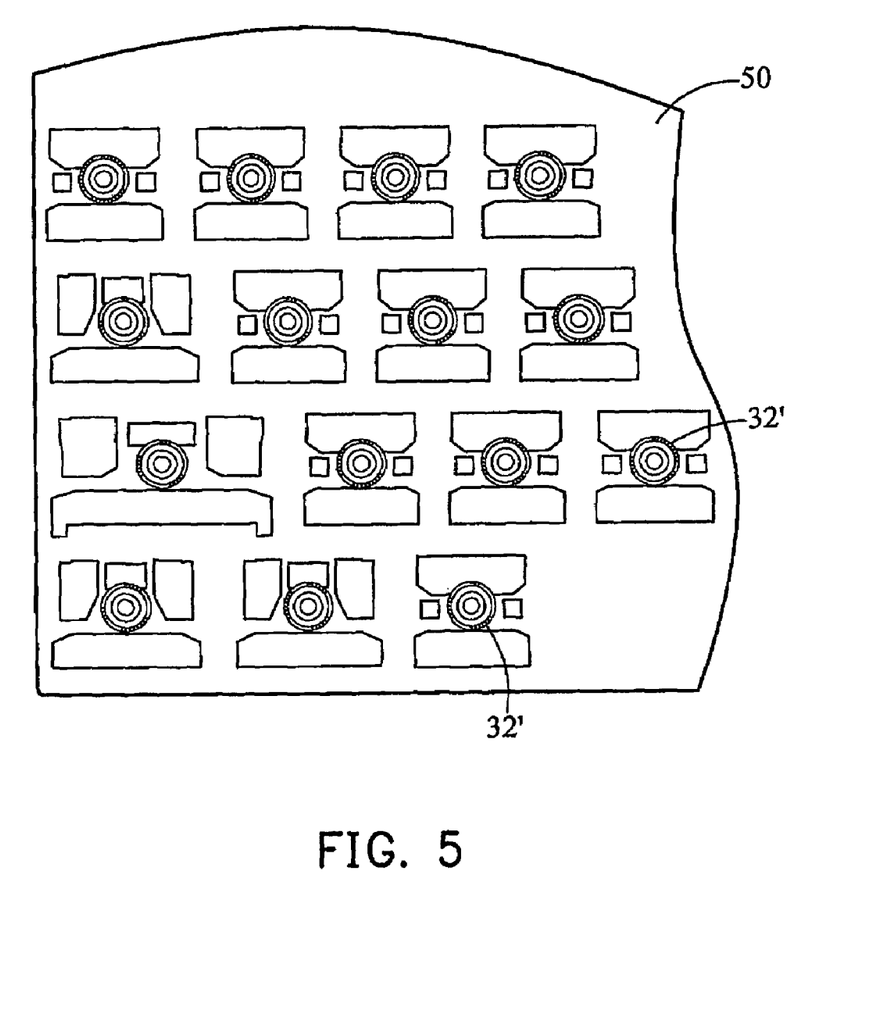
FIG. 5 is a partial top view of marked elastic domes disposed on the elastic sheet of a keyboard.

FIG. 5 is a partial top view of marked elastic domes disposed on the elastic sheet of a keyboard. In FIG. 5, the elastic domes 32' are randomly adhered to the elastic sheet 50. If the elastic dome 32' is broken, the related mold cavity of the mold or jigs can be checked according to the serial number, revealing problems with the molding fabrication and/or defects in the mold or jigs, while reducing the yield ratio.

Figure 6:
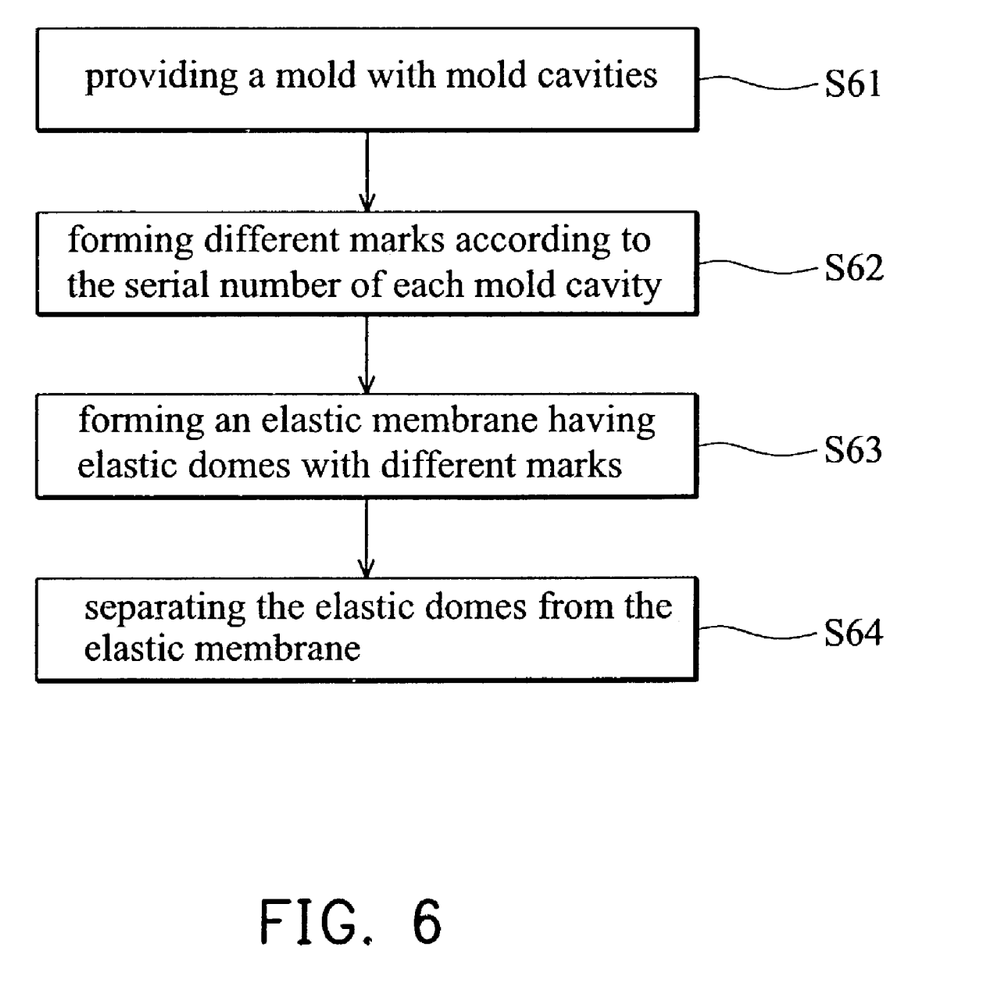
FIG. 6 is a flowchart of fabricating the marked elastic domes.

FIG. 6 is a flowchart of fabricating the marked elastic domes. Referring to FIGS. 2A~2C, 3A and 6, the present invention provides a method for fabricating elastic domes. The method first comprises providing a mold (S61), including a cope 20 and a drag 230. The cope 20 has a plurality of mold cavities 22. Each of the mold cavities 22 has a serial number 21 and a first markable surface 224 with different first marks 223. The serial numbers 21 are numbered by the position of the mold cavities 22 (S62). The first marks 223 are formed with respect to the serial number 21 of each mold cavity. Next, an elastic membrane 30 with a plurality of marked elastic domes 32 is formed by the mold (S63). The second marks 323 on the elastic domes 32 represent the position or a serial number with respect to the mold cavities 22. Finally, the marked elastic domes 32 are separated from the elastic membrane 30 (S64). For use in the key structure of keyboards for notebook computers.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A key structure for a keyboard, comprising:
   a base sheet;
   a key cap;
   a linking mechanism, movably connecting the key cap and the base sheet;
   an elastic dome, having a markable surface and disposed on the base sheet below the key cap; and
   a plurality of marks disposed on the markable surface,
   wherein the markable surface is divided into a plurality of mark areas to distinguish the marks into a plurality of groups, and the marks of each of the mark areas have the same intervals.

2. The key structure as claimed in claim 1, wherein the marks represent a parameter of manufacturing the elastic dome.

3. The key structure as claimed in claim 1, wherein the marks are protrusions.

4. The key structure as claimed in claim 1, wherein the marks are recesses.

5. The key structure as claimed in claim 1, wherein the elastic dome further includes a datum on the markable surface.

6. The key structure as claimed in claim 1, wherein the figures of the marks between each two mark areas are different.

7. The key structure as claimed in claim 1, wherein the elastic dome further includes separations between each two mark areas.

8. The key structure as claimed in claim 1, wherein the elastic dome further includes a flange at the bottom portion, and the markable surface is the top surface of the flange.

9. The key structure as claimed in claim 1, wherein the elastic dome further includes a contact portion for supporting the key cap, and the markable surface is the top surface of the contact portion.

10. The key structure as claimed in claim 1, wherein the plurality of marks identify a particular mold used to make each elastic dome.

11. The key structure as claimed in claim 1, wherein the plurality of marks provide a serial number.

* * * * *